(12) United States Patent
Engelhardt

(10) Patent No.: US 6,515,802 B2
(45) Date of Patent: Feb. 4, 2003

(54) OPTICAL ARRANGEMENT

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 61 days.

(21) Appl. No.: 09/821,286

(22) Filed: Mar. 29, 2001

(65) Prior Publication Data

US 2001/0043403 A1 Nov. 22, 2001

(30) Foreign Application Priority Data

Apr. 3, 2000 (DE) .......................... 100 16 361

(51) Int. Cl.⁷ .................. G02B 27/12; G02B 27/10; G02B 6/10
(52) U.S. Cl. .................. 359/640; 359/639; 359/618; 385/146
(58) Field of Search ................ 359/640, 639, 359/618; 385/146, 125, 37

(56) References Cited

U.S. PATENT DOCUMENTS

| | | | | |
|---|---|---|---|---|
| 4,472,797 A | * | 9/1984 | Nicia .............................. 370/1 |
| 4,835,384 A | * | 5/1989 | Jones et al. .................. 250/226 |
| 5,318,022 A | * | 6/1994 | Taboada et al. ............. 128/633 |
| 6,125,228 A | * | 9/2000 | Gong .......................... 385/146 |
| 6,137,933 A | * | 10/2000 | Hunter et al. ................. 385/37 |
| 2001/0029009 A1 | * | 10/2001 | Jung et al. .................... 433/29 |

* cited by examiner

*Primary Examiner*—Georgia Epps
*Assistant Examiner*—Timothy J Thompson
(74) *Attorney, Agent, or Firm*—Simpson & Simpson, PLLC

(57) ABSTRACT

An optical arrangement for at least partial spectral selection of light components from a polychromatic light beam (1) is configured, in the interest of multifarious spectral selection capabilities, with means of simple design in such a way that a dispersive medium (2) for spatial spectral spreading of the polychromatic light beam (1) into individual light bundles (3), and an attenuation means (5, 6) for at least partial attenuation of the intensity of one or more light bundles (3), are provided.

35 Claims, 7 Drawing Sheets

OPTICAL ARRANGEMENT

CROSS REFERENCE TO RELATED APPLICATIONS

This application claims priority of a German patent invention DE 100 16 361.0 filed Apr. 3, 2000 which is incorporated by reference herein.

FIELD OF THE INVENTION

The invention concerns an optical arrangement for at least partial spectral selection of light components from a polychromatic light beam.

BACKGROUND OF THE INVENTION

In many optical applications, it is necessary to block or attenuate specific spectral components, and in turn not to block or attenuate other light components, of a polychromatic light beam that has spectrally different light components. A polychromatic light beam or polychromatic light bundle is thereby selectively adjusted in terms of its spectrum.

In confocal scanning microscopy, for example, multiple-line lasers, inter alia, are used to illuminate the specimen, and it would be desirable to regulate the light outputs or light intensities of the individual lines separately from one another, and selectably to block individual spectral light components. Acousto-optical modulators, inter alia, are used for this purpose.

The acousto-optical modulators used hitherto are, on the one hand, very flexible; but on the other hand they have the great disadvantage of being very complex in terms of construction and electronic control, and for these and other reasons they are very expensive.

SUMMARY OF THE INVENTION

It is therefore the object of the present invention to describe an optical arrangement of the kind cited initially for at least partial spectral selection of light components from a polychromatic light beam in which multifarious spectral selection capabilities are realized with means of simple design.

The above object is achieved by an optical arrangement for at least partial spectral selection of light components from a polychromatic light beam. The arrangement comprising: a dispersive medium for spatial spectral spreading of the polychromatic light beam and thereby defining a plurality of individual light bundle, and an attenuation means for at least partial attenuation of the intensity of one or more light bundles.

Additionally the above object is achieved by an arrangement for at least partial spectral selection of light components from a polychromatic light beam. The arrangement comprising: a dispersive medium for spatial spectral spreading of the polychromatic light beam wherein the dispersive medium is a four-prism arrangement, the dispersive medium defines a plurality of individual light bundles, and an attenuation means for at least partial attenuation of the intensity of one or more light bundles.

A further arrangement solve the above problem. The arrangement comprising: a dispersive medium for spatial spectral spreading of the polychromatic light beam and thereby defining a plurality of individual light bundles, the dispersive medium is configured as a parallelepipedal glass member with two parallelogram-shaped side surfaces and an attenuation means for at least partial attenuation of the intensity of one or more light bundles.

What has been recognized first of all according to the present invention is that multifarious spectral selection capabilities can be implemented not only by way of complex acousto-optical modulators. Further according to the present invention, an arrangement which makes possible a quasi-mechanical selection of individual light bundles is made available for this purpose. What is made available for this purpose firstly is a dispersive medium for spatial spectral spreading of the polychromatic light beam into individual light bundles. After this spreading, a definable partial or complete attenuation of the intensity of one or more definable light bundles then takes place by means of an attenuation means. Both an intensity reduction and a complete blocking of a light bundle are thus possible. The term "light bundle" refers to a light beam that exhibits one or more discrete wavelengths or a wavelength band. A complex electronic control system is usually not necessary in the context of the arrangement according to the present invention. This makes the assemblage considerably simpler and less expensive.

The optical arrangement according to the present invention consequently makes available an arrangement in which multifarious spectral selection capabilities are realized with means of simple design.

In a concrete and very simple embodiment of the optical arrangement, the dispersive medium could have a prism. Such prisms have been known for some time and are usually very easy to manufacture.

The prism could be rotatable, within a plane spanned by the spread light bundle, about an axis extending perpendicular to the plane. This makes possible a spatial displacement of the light bundles. This displacement can be used, in interaction with the attenuation means, for partial or complete attenuation of one or more light bundles. Displacement in the region of a stop as the attenuation means might be imagined in this context.

In particularly practical fashion, the prism could have placed after it an optical system that preferably has a lens. This makes it possible to guide the spread light bundles in parallel fashion.

In a further embodiment, the dispersive medium could have a four-prism arrangement. Concretely, the four-prism arrangement comprise a first and a second prism pair arranged in mirror symmetry with respect to one another. The light bundle that is spectrally spread and diverged by the first prism is then collimated by the second prism of the prism pair. The first and second prism pair could moreover be arranged in mirror symmetry with respect to a line perpendicular to the propagation direction of the light bundles. The second prism pair serves, in this context, to recombine the light bundles. Between the first and second prism pair, the manipulation in terms of blocking and attenuation by means of the attenuation means is performed. If, after passing through the arrangement, the light is to pass through a stop or is to be coupled into a light-guiding fiber, it is essential to ensure that the spatial spectral spreading is completely annulled. Otherwise spectral differences in loss levels can occur at the stop or upon coupling into the fiber. It is particularly favorable in this context if the second prism pair is aligned in exact mirror symmetry with respect to the first prism pair.

In a further embodiment, the dispersive medium could have a glass member. The glass member could, in particular, be configured parallelepipedally, with two parallelogram-shaped side surfaces, or trapezoidally. In the interest of reliable recombination of the spread light bundles, a first and second glass member are arranged in mirror symmetry with respect to a line perpendicular to the propagation direction of the light bundles. This kind of arrangement of the first and second glass member reduces the stringent requirements in terms of alignment accuracy. Whereas a tilting of one prism results in an angular error (and, if the tilted prism is one of the inner prisms, in a beam offset which in turn interferes with correct spectral recombination), a tilting of one of the glass members results only in a parallel offset, which only slightly degrades the spectral properties of the arrangement. In particular, coupling into a light-guiding fiber after the arrangement is not influenced, since the collimated recombined light bundles are focused by the coupling-in optical system onto the fiber end even in the presence of a beam offset. In this fashion, an embodiment of the optical arrangement with two the first and second glass member makes available a simplified optical arrangement.

In a further alternative embodiment, the dispersive medium could have a grid.

In the interest of reliable and at the same time simple selection of light components from a polychromatic light beam, the attenuation means could have one or more stops combined with one another. Reliable mechanical influence on the light bundle or bundles is thereby achieved.

Concretely, the stop or stops could be implemented by way of at least one stop wheel rotatably mounted about a rotation axis. One or more stops are implemented on a stop wheel of this kind.

In the interest of a particularly multifarious selection, several stop wheels could be arranged one behind another. A stop wheel is usually positioned in such a way that light bundles of identical color describe concentric circles on the stop wheel when the stop wheel is rotated.

The stop wheel or wheels could have at least one stop opening. The rotation axis of a stop wheel could, in particularly favorable fashion, be arranged parallel to the propagation direction of the light bundles. Concretely, the stop wheel could have a disk having at least one stop opening. On a disk of this kind it is possible to implement a variety of stop shapes that could make possible both complete blocking of the spatially separated light bundles and attenuation or partial blockage of the light bundles.

For effective beam attenuation, the disk could have a pattern of stop openings with a differing arrangement density. A different level of attenuation of one or more light bundles could then be achieved depending on the region on the disk that is selected.

In an alternative exemplary embodiment, the stop or stops could be implemented by way of one or more stop slides. In this context, the stop slides, which have one or more stops, are slid into the beam path in order to attenuate or block one or more light bundles. Several stop slides could be arranged one behind another in order to make available a great variety of influencing capabilities. In particularly effective fashion, the sliding direction of the stop slide or slides could extend perpendicular to the propagation direction of the light bundles. The stop slide or slides could have at least one stop opening.

In the context of both a stop wheel and a stop slide, at least one stop opening could be of circular configuration. A greater or lesser attenuation of the light bundle can be achieved depending on the magnitude of the diameter of the circular stop opening in relation to the diameter of the light beam that is to be influenced.

In the interest of a particularly sensitive and accurately adjustable attenuation operation, at least one stop opening could have an opening width that decreases along a definable distance or could be configured in the manner of a comet tail, so that the intensity of a light bundle influenced by the stop opening can be modified by rotating the stop wheel or displacing the stop slide. The light bundle in question is attenuated to different degrees depending on the position of the stop wheel or stop slide.

Alternatively or in addition to a stop arrangement, the attenuation means could have one or more polarizers or polarizing optical systems. In particular, a combination of two linear polarizers could be provided, such that at least one linear polarizer could be rotatably mounted. In the context of laser light, which is usually polarized in any case, a single polarizing filter could effect sufficient attenuation.

Alternatively or additionally, the attenuation means could furthermore have LCD elements. When LCD elements are used, however, it is important to ensure, for example if the arrangement is used in a scanning microscope, that the periodic transmission changes of the LCDs do not result in beat effects with the beam deflection frequency of a scanning device. For this purpose, in particularly advantageous fashion, the LCD activation frequency could be synchronized with the beam deflection frequency. It may also be possible to correct intensity fluctuations electronically or in software-controlled fashion after data recording.

When an LCD attenuator is used, in additionally advantageous fashion the LCD attenuator could be configured to switch off the light beam, and in particular the scanning light beam, at beam reversal points.

Alternatively or additionally, the attenuation means could have gray wedges or neutral density filters.

Attenuation of the intensity of one or more individual light bundles could moreover be accomplished by way of a kind of disrupted total reflection. For that purpose, the attenuation means could have at least one device influencing the total reflection of a light bundle at a boundary surface. Concretely, in an arrangement of this kind, the chromatically mixed light bundle (the polychromatic light beam) could be spatially spectrally spread by refraction at one plane of a glass member. The glass member could be cut in such a way that the light bundles proceeding in chromatically separate fashion experience at least one total reflection at a further boundary plane before they leave the glass member. To influence the total reflection at the boundary surface or boundary plane, the device could have a glass element that can be brought closer to the boundary surface. The proportion of totally reflected light of each light bundle can thereby be adjusted as a function of the distance over which the glass element is brought, from outside, closer to the totally reflective boundary surface. If the glass element is in complete contact, the light leaves the glass member through the glass element. Total reflection then does not take place, and the light bundle in question is consequently completely blocked or attenuated. In other words, the degree of total reflection of a light bundle can be adjusted in controlled fashion by bringing a glass element closer, in controlled fashion, to the totally reflecting boundary surface.

A positioning element could be made available to control the process of bringing the glass element closer. Concretely, the positioning element could be a piezoelectric positioning element.

In the interest of a particularly multifarious selection, a device influencing the total reflection of a light bundle at a boundary surface could be associated with each light bundle.

When a light bundle is transversely "clipped" by a mechanical element such as, for example, a stop, this results in a deformation of the transverse beam cross section. This can be remedied if the light is allowed to enter a monomode glass fiber. The attenuation means itself could thus have a monomode glass fiber with which the light bundle is "clipped."

Fundamentally, the attenuation means could have an aperture stop whose diameter is preferably adjustable. This makes available an attenuation means that is on the one hand versatile and on the other hand of simple design.

After spreading and attenuation of the light bundle or bundles, it is usually necessary to recombine the remaining light bundle or bundles in order to make available a single light beam or a single light bundle. For this purpose, a second dispersive medium could be made available after the attenuation means in order to recombine the remaining light bundles.

As an alternative to a second dispersive medium of this kind, a reflection device for the light bundle or bundles could be arranged after the attenuation means. In other words, in this case a recombination is performed after the manipulation of individual light bundles, by passing in reverse through the spreading optical elements or the spreading dispersive medium. For better separation of the original polychromatic light beam from the resulting light beam or light bundle, the reflection device could be arranged and/or configured in such a way that the reflected light bundle or bundles can be reflected at a reflection angle that differs at least slightly from zero degrees. The light is thus reflected, directly behind the attenuation means and at a reflection angle slightly different from zero degrees, into the dispersive medium.

In an embodiment of particularly simple design, the reflection device could have a mirror.

BRIEF DESCRIPTION OF THE DRAWINGS

There are various ways of advantageously embodying and developing the teaching of the present invention. Reference is made to the drawings. In the drawings.

DETAILED DESCRIPTION OF THE INVENTION

Figure 1:
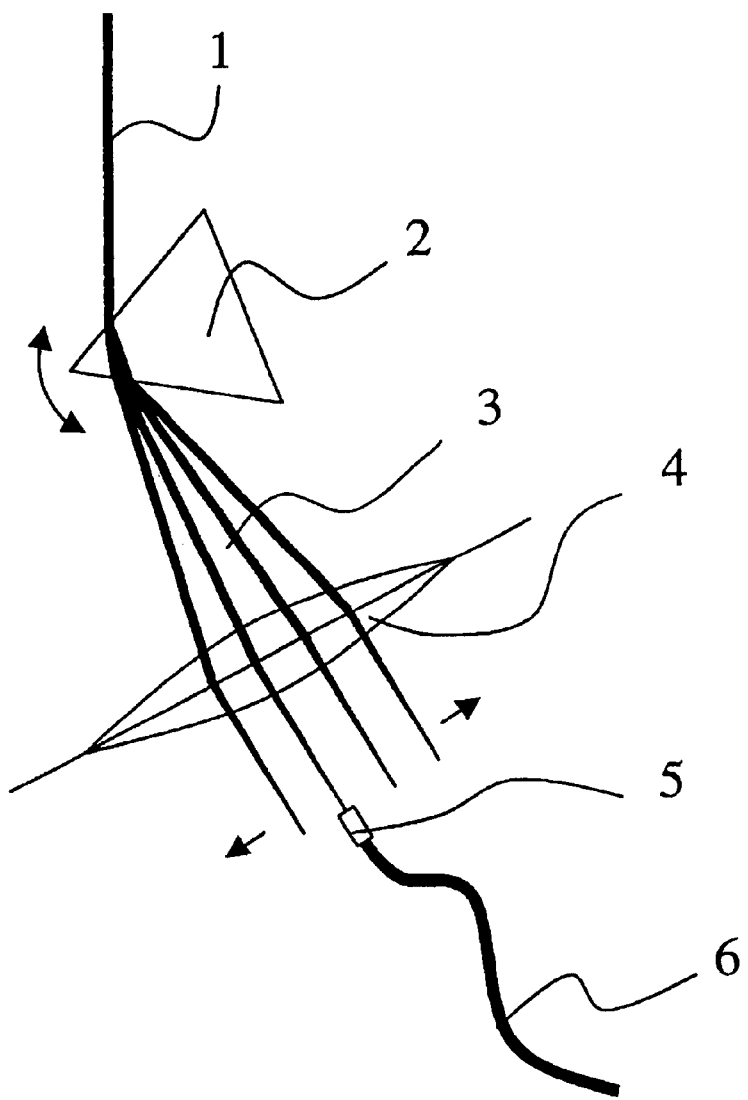
FIG. 1 schematically depicts the first exemplary embodiment of an optical arrangement according to the present invention.

FIG. 1 schematically depicts the first exemplary embodiment of an optical arrangement according to the present invention. A four-color incoming polychromatic light beam 1 or polychromatic light bundle is split in spatially spectral fashion, with a dispersive medium configured as a prism 2, into four light bundles 3. The individual light bundles 3 are focused and made parallel with an optical system 4. Optical system 4 has a lens. By rotating prism 2, it is possible to select light bundle 3 that is coupled via a coupling-in optical system 5 into a glass fiber 6. Glass fiber 6 could be a monomode glass fiber. By fine-scale rotation of prism 2, grazing coupling and thus attenuation can be achieved.

Figure 2:
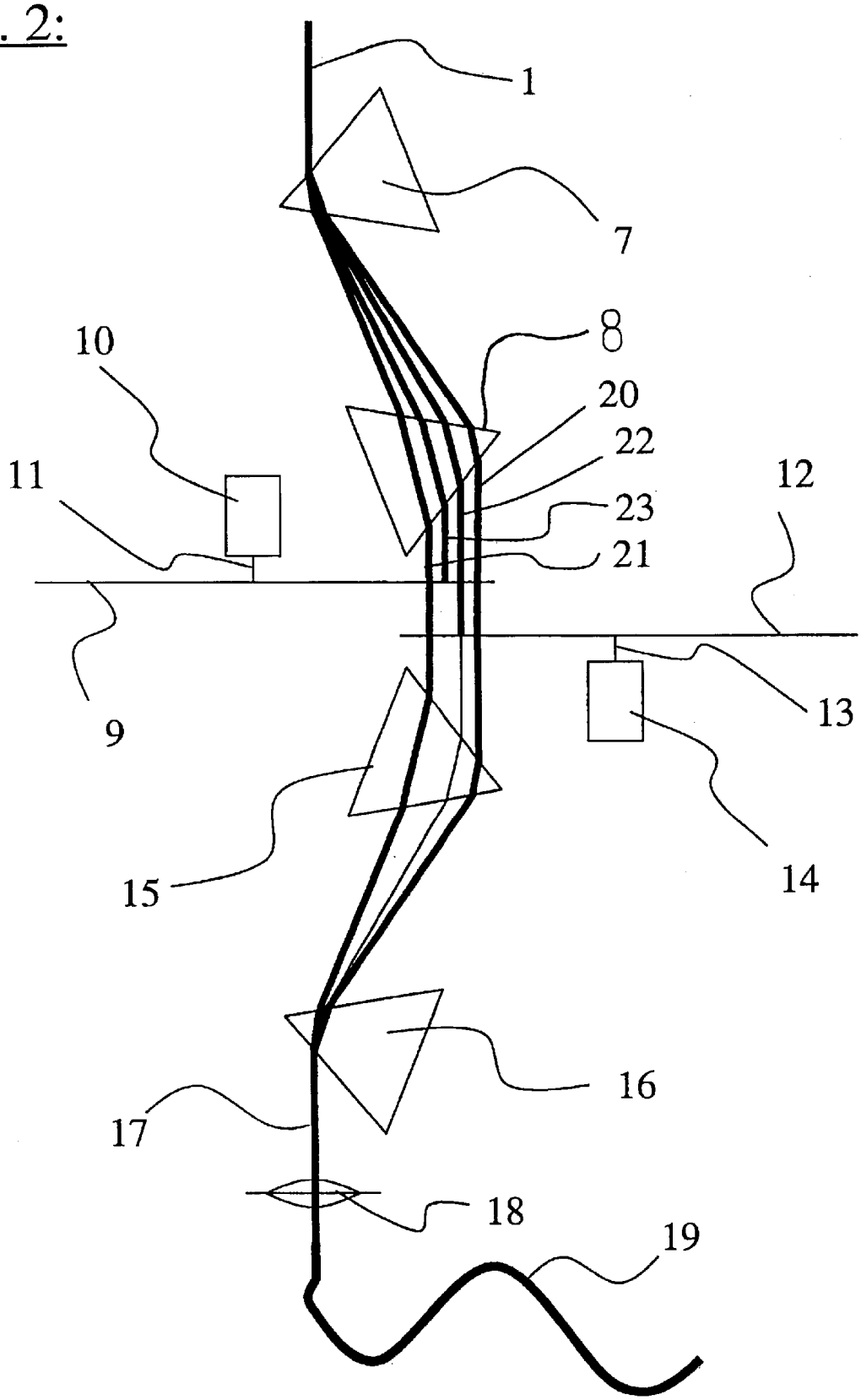
FIG. 2 schematically depicts the second exemplary embodiment of an optical arrangement according to the present invention, a four-prism arrangement being implemented here.

FIG. 2 schematically depicts the second exemplary embodiment of an optical arrangement according to the present invention. Here the optical arrangement is embodied as a four-prism arrangement. The four-prism arrangement is constituted by two prism pairs. The first prism pair comprises prisms 7 and 8. A stop wheel 9, which can be driven by means of a positioning drive 10 via a shaft 11, is then provided as the attenuation means. Arranged after stop wheel 9 is a further stop wheel 12 that can be driven via a shaft 13 and a positioning drive 14.

The second prism pair is constituted by prisms 15 and 16, which bring about a recombination of the spread light bundles 20, 21, 22, and 23 into one combined light bundle 17. Light bundle 17 is focused by way of a coupling-in optical system into a glass fiber 19.

In the above second exemplary embodiment, light bundles 20 and 21 pass undisturbed through the two stop wheels 9 and 12. Light bundle 23 is blocked by stop wheel 9, while light bundle 22 is transversely clipped by stop wheel 12 and thus attenuated in total light intensity.

Figure 3:
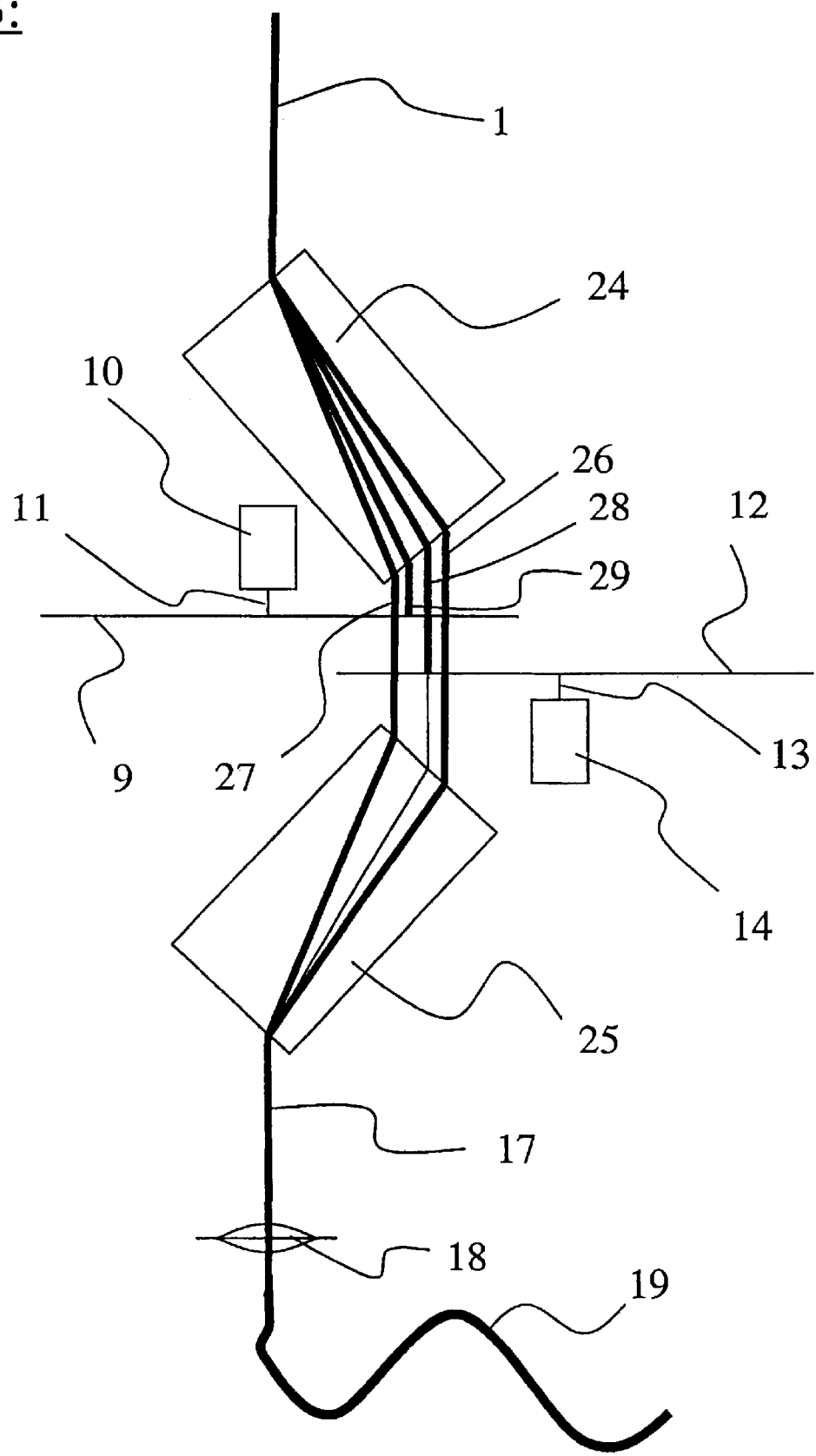
FIG. 3 schematically depicts the third exemplary embodiment of an optical arrangement according to the present invention, a first and a second glass member being provided here.

FIG. 3 schematically depicts the third exemplary embodiment of an optical arrangement according to the present invention. The arrangement has a first and a second glass member or glass blocks 24 and 25 as the dispersive medium. Otherwise the same stop wheels 9 and 12 as in the second exemplary embodiment are used. The arrangement according to the third exemplary embodiment has the advantage that the stringent requirements in terms of alignment accuracy are reduced. Tilting of one of glass blocks 24 or 25 results only in a parallel offset, which only slightly degrades the spectral properties of the arrangement. In particular, coupling into a light-guiding fiber 19 after the arrangement is not influenced, since the collimated recombined light bundle 17 is focused by coupling-in optical system 18 onto the fiber end even in the presence of a beam offset. The incoming polychromatic light beam is four-colored. It is spatially spectrally spread in glass block 24. After leaving glass block 24, light bundles 26, 27, 28, and 29, proceeding in spectrally separated fashion, encounter the two stop wheels 9 and 12. Light bundles 26 and 27 pass undisturbed through both stop wheels. Light bundle 29 is blocked by stop wheel 9, while light bundle 28 is transversely clipped by stop wheel 12 and thus attenuated in its total light output or intensity. With the aid of glass block 25, the remaining light bundles 26, 27, and 28 are recombined into one light bundle 17 and coupled into glass fiber 19.

Figure 4:
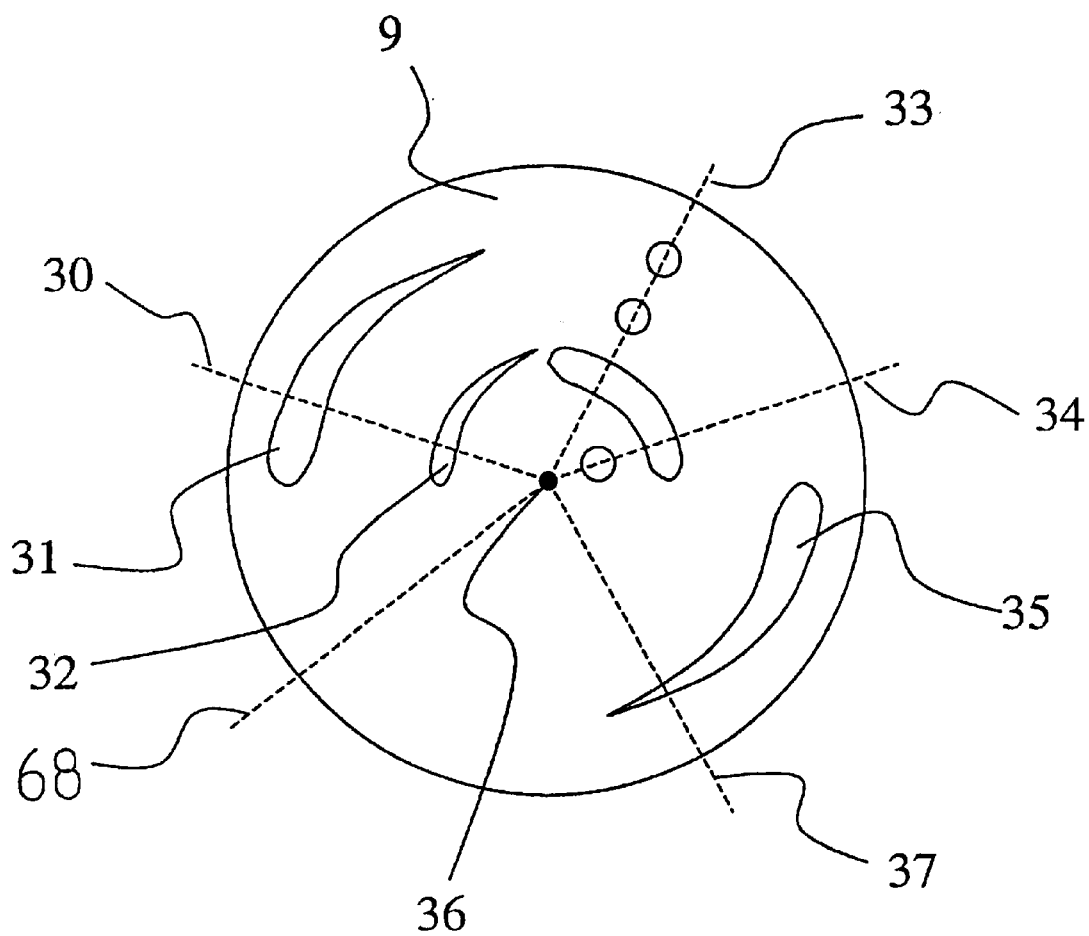
FIG. 4 shows a schematic plan view of a stop wheel from FIG. 2.

FIG. 4 shows, in a schematic plan view, stop wheel 9 of FIG. 2. In a position 30, stop openings 31 and 32 would clip bundles 21 and 22 of FIG. 2. Light bundles 20 and 23 would be blocked. Rotating stop wheel 9 clockwise about an axis 36 would cause the total light outputs of clipped bundles 21 and 22 to be increased, whereas counterclockwise rotation would cause a decrease in the total light output of the clipped bundles 21 and 22. In a position 33, only light bundle 20 would be blocked. In a position 34, light bundles 20 and 22 would be blocked. In a position 37, light bundles 21, 22, and 23 would be blocked and light bundle 20 would be attenuated. In a position 68, all bundles 20 through 23 would be blocked.

Figure 5:
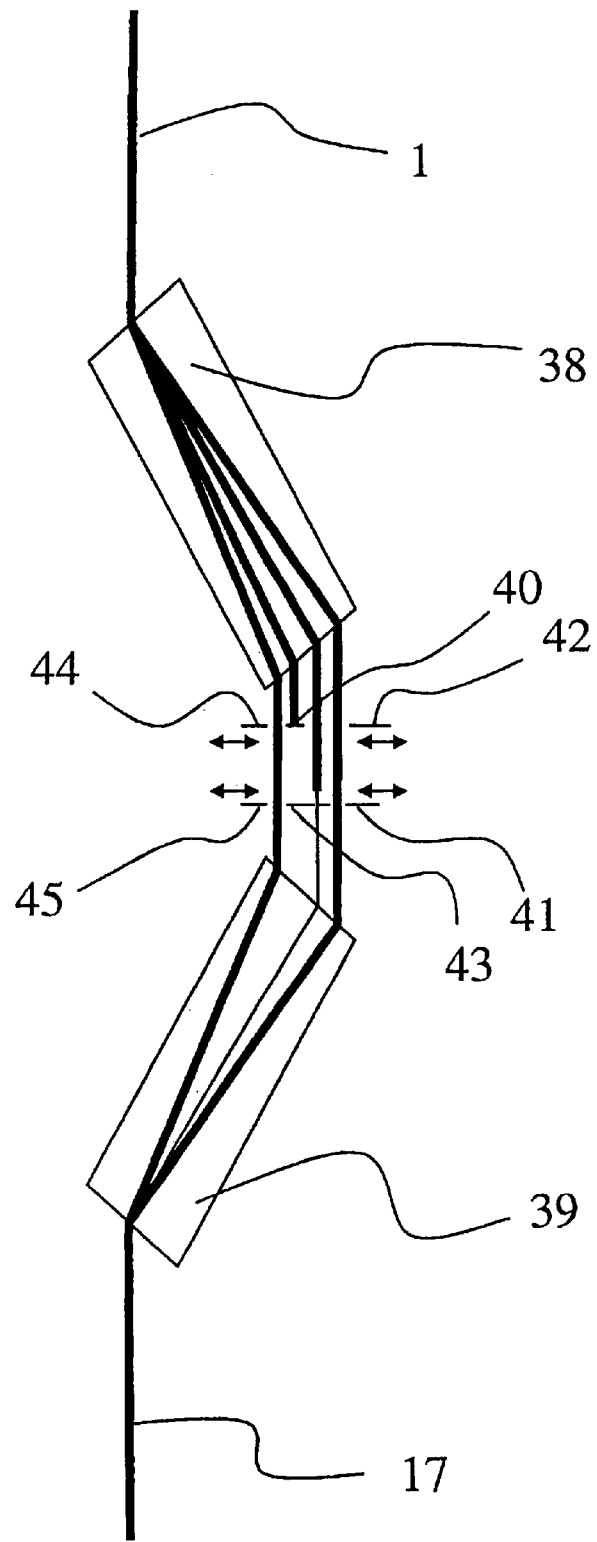
FIG. 5 schematically depicts the fourth exemplary embodiment of an optical arrangement according to the present invention, stop slides being provided here as the attenuation means.

FIG. 5 schematically depicts the fifth exemplary embodiment of an optical arrangement according to the present invention. In the exemplary embodiment shown in FIG. 5, stop slides 40 through 45 are provided as attenuation means. In order to save space, two glass blocks 38 and 39 are embodied as trapezoids.

Figure 6:
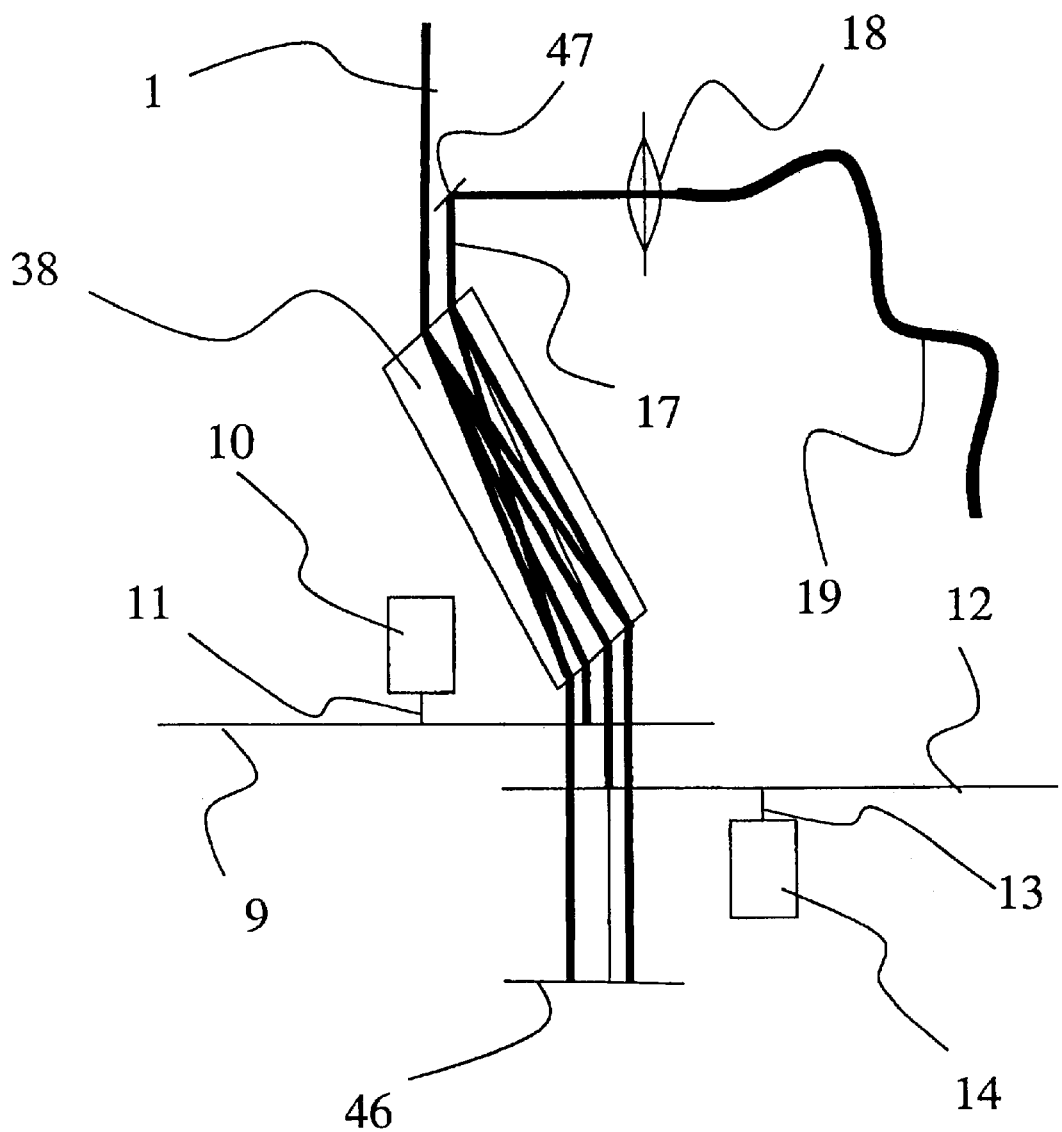
FIG. 6 schematically depicts the fifth exemplary embodiment of an optical arrangement according to the present invention, a reflection device for reflection of the influenced light bundles being provided here.

FIG. 6 schematically depicts the fifth exemplary embodiment of an optical arrangement according to the present invention, in which only one glass block 38 is provided. The light influenced by two stop wheels 9 and 12 is reflected back into glass block 38, with a slight angular error, by a mirror 46. Output light 17 is then deflected by a mirror 47 and coupled into a glass fiber 19.

Figure 7:
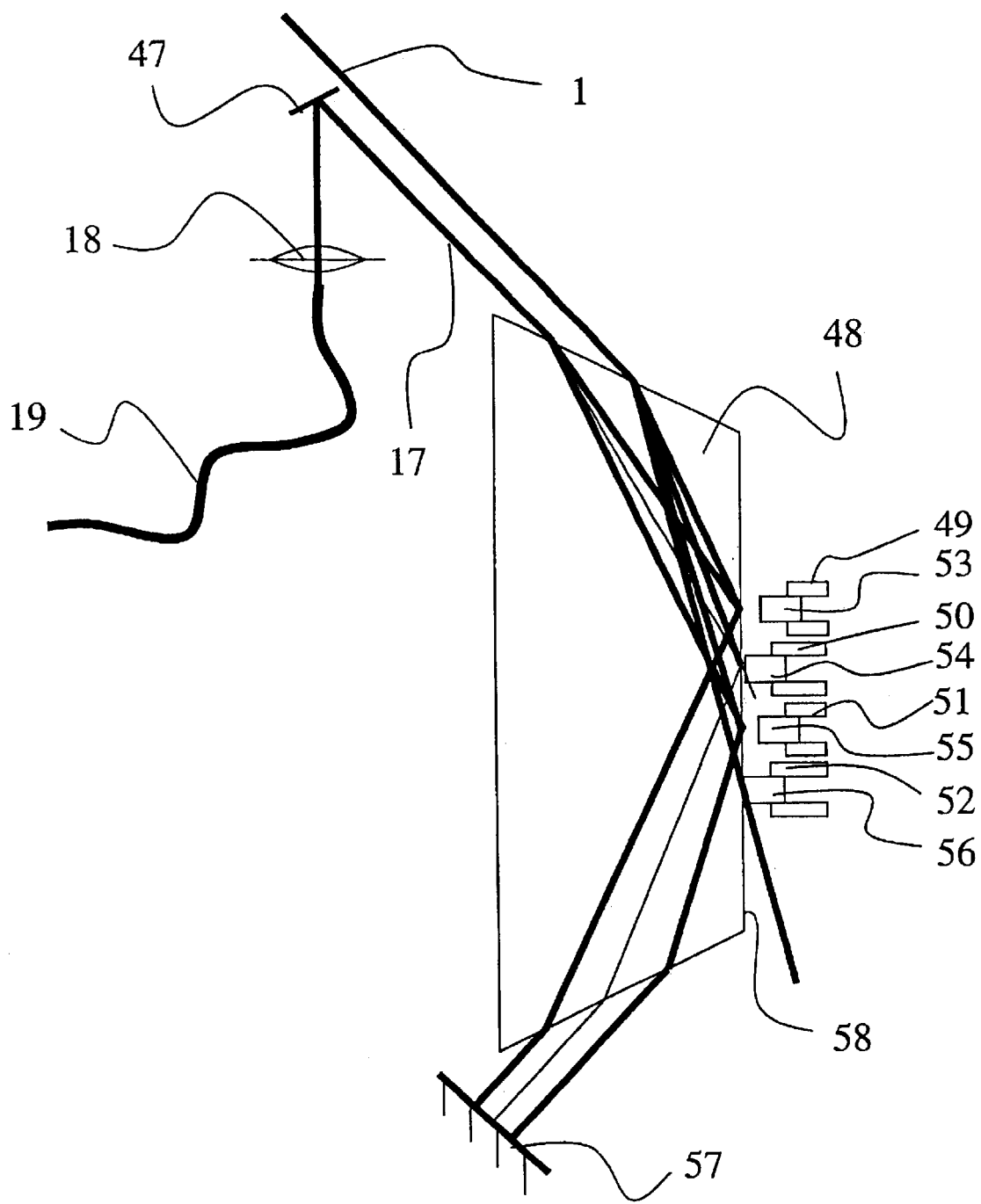
FIG. 7 schematically depicts the sixth exemplary embodiment of an optical arrangement according to the present invention.

FIG. 7 schematically depicts the sixth exemplary embodiment of an optical arrangement according to the present invention. The exemplary embodiment has one glass block 48. Without glass elements 53 through 56, the spatially spectrally split light bundles would be totally reflected at boundary surface 58 of glass block 48. The degree of total reflection can be individually controlled for each light bundle by bringing glass blocks or glass elements 53 through 56 closer in controlled fashion. Glass block 56 that is in complete contact prevents total reflection, and thus completely couples out the light bundle in question. Glass blocks 53 and 55 do not influence the respective total reflection, because of their great spacing. Glass block 54 is located close to surface 58 but is not completely in contact. This brings about a partial coupling out or attenuation. The distances are adjusted by way of piezoelectric positioning elements 49 through 52.

In order to avoid repetition, reference is made to the general portion of the description and to the appended claims as regards further advantageous embodiments of the optical arrangement according to the present invention.

In conclusion, be it noted expressly that the exemplary embodiments discussed above of the optical arrangement according to the present invention serve merely to describe the teaching claimed, but do not limit it to the exemplary embodiments.

PARTS LIST

| | |
|---|---|
| 1 | Polychromatic light beam |
| 2 | Prism |
| 3 | Spectrally spread light bundle |
| 4 | Optical system |
| 5 | Coupling-in optical system |
| 6 | Glass fiber |
| 7 | Prism |
| 8 | Prism |
| 9 | Stop wheel |
| 10 | Positioning drive |
| 11 | Shaft |
| 12 | Stop wheel |
| 13 | Shaft |
| 14 | Positioning drive |
| 15 | Prism |
| 16 | Prism |
| 17 | Combined light bundle |
| 18 | Coupling-in optical system |
| 19 | Glass fiber |
| 20–23 | Spatially spectrally separated light bundles |
| 24 | first glass member |
| 25 | second glass member |
| 26–29 | Spatially spectrally separated light bundles |

-continued

PARTS LIST

| | |
|---|---|
| 30 | Position |
| 31 | Stop opening |
| 32 | Stop opening |
| 33 | Position |
| 34 | Position |
| 35 | Stop opening |
| 36 | Rotation axis |
| 37 | Position |
| 38 | first glass member |
| 39 | second glass member |
| 40–45 | Stop slides |
| 46 | Mirror |
| 47 | Mirror |
| 48 | Glass block, glass member |
| 49–52 | (Piezoelectric) positioning elements |
| 53–56 | Glass elements |
| 57 | Mirror |
| 58 | Surface of glass block 48 |
| 68 | Position |

What is claimed is:

1. An optical arrangement for at least partial spectral selection of light components from a polychromatic light beam comprising a dispersive medium for spatial spectral spreading of the polychromatic light beam defining a plurality of individual light bundles, and an attenuation means for at least partial attenuation of the intensity of one or more of said light bundles, said dispersive medium comprising a prism adapted to disperse the polychromatic light beam and be mechanically movable for selecting a light bundle for coupling to the attenuation means.

2. The optical arrangement as defined in claim 1, wherein the prism is rotatable within a plane spanned by the light bundle, about an axis extending perpendicular to the plane.

3. The optical arrangement as defined in claim 1, wherein an optical system is positioned with respect to the prism, wherein the optical system is a lens.

4. The optical arrangement as defined in claim 1, wherein the attenuation means comprises a monomode glass fiber.

5. The optical arrangement as defined in claim 1, wherein the attenuation means comprises at least one polarizer or a polarizing optical system.

6. The optical arrangement as defined in claim 1, wherein the attenuation means comprises LCD elements with an LCD activation frequency synchronized with the beam deflection frequency.

7. The optical arrangement as defined in claim 1, wherein the attenuation means comprises gray wedges or neutral density filters.

8. An optical arrangement for at least partial spectral selection of light components from a polychromatic light beam, comprising a dispersive medium for spatial spectral spreading of the polychromatic light beam wherein the dispersive medium is a four-prism arrangement defining a plurality of individual light bundles, and an attenuation means for at least partial attenuation of the intensity of one or more of said light bundles.

9. The optical arrangement as defined in claim 7, wherein the four-prism arrangement comprises a first prism pair and a second prism pair arranged in mirror symmetry with respect to one another and with respect to a line perpendicular to the propagation direction of the light bundles.

10. The optical arrangement as defined in claim 7, wherein the attenuation means comprises at least one stop.

11. The optical arrangement as defined in claim 9, wherein the at least one stop is implemented by way of at least one stop wheel rotatably mounted on a shaft defining an axis of rotation.

12. The optical arrangement as defined in claim 10, wherein several stop wheels are arranged one behind another and wherein the rotation axis is arranged parallel to the propagation direction of the light bundles.

13. The optical arrangement as defined in claim 9, wherein the at least one stop is implemented by way of one or more stop slides arranged one behind another and the sliding direction of the stop slide extends perpendicular to the propagation direction of the light bundles.

14. The optical arrangement as defined in claim 12, wherein the stop slide comprises at least one stop opening wherein at least one stop opening is circular.

15. An optical arrangement for at least partial spectral selection of light components from a polychromatic light beam, comprising a dispersive medium for spatial spectral spreading of the polychromatic light beam to define a plurality of individual light bundles, the dispersive medium configured as a parallelepipedal glass member with two parallelogram-shaped side surfaces, and an attenuation means for at least partial attenuation of the intensity of one or more of said light bundles.

16. The optical arrangement as defined in claim 14, wherein first and second glass members are arranged in mirror symmetry with respect to a line perpendicular to the propagation direction of the light bundles.

17. The optical arrangement as defined in claim 14, wherein the attenuation means comprises one or more stops combined with one another.

18. The optical arrangement as defined in claim 16, wherein the stop is implemented by way of at least one stop wheel rotatably mounted on a shaft defining an axis of rotation.

19. The optical arrangement as defined in claim 17, wherein several of said stop wheels are arranged one behind another and wherein the rotation axis is arranged parallel to the propagation direction of the light bundles.

20. The optical arrangement as defined in claim 17, wherein the stop wheel comprises at least one stop opening.

21. The optical arrangement as defined in claim 16, wherein the stop is implemented by way of one or more stop slides arranged one behind another and the sliding direction of the stop slide extends perpendicular to the propagation direction of the light bundles.

22. The optical arrangement as defined in claim 21, wherein the stop slide comprises at least one stop opening wherein at least one stop opening is circular.

23. The optical arrangement as defined in claim 21, wherein at least one stop opening comprises an opening width that decreases along a definable distance or is configured in the manner of a comet tail, so that the intensity of a light bundle influenced by the stop opening can be modified by displacing the stop slide.

24. The optical arrangement as defined in claim 14, wherein the attenuation means comprises LCD elements with an LCD activation frequency synchronized with beam deflection frequency.

25. The optical arrangement as defined in claim 14, wherein the attenuation means comprises gray wedges, neutral density filters or a device influencing the total reflection of a light bundle at a boundary surface.

26. The optical arrangement as defined in claim 25, wherein the device comprises at least one glass element that can be brought closer to the boundary surface.

27. The optical arrangement as defined in claim 24, including positioning means for controlling the process of bringing the glass element closer.

28. The optical arrangement as defined in claim 25, wherein the positioning means is a piezoelectric positioning element.

29. The optical arrangement as defined in claim 25, wherein one glass element influencing the total reflection of a light bundle at a boundary surface is associated with each light bundle.

30. An optical arrangement for at least partial spectral selection of light components from a polychromatic light beam, comprising a dispersive medium for spatial spectral spreading of the polychromatic light beam to define a plurality of individual light bundles, the dispersive medium configured as a parallelepipedal glass member with two parallelogram-shaped side surfaces, an attenuation means for at least partial attenuation of the intensity of one or more of said light bundles and a reflection device for the at least one light bundle arranged after the attenuation means.

31. The optical arrangement as defined in claim 29, wherein the attenuation means comprises one or more stops combined with one another.

32. The optical arrangement as defined in claim 29, wherein the one or more stops is implemented with at least one stop wheel rotatably mounted on a shaft defining an axis of rotation.

33. The optical arrangement as defined in claim 30, wherein several stop wheels are arranged one behind another and wherein the rotation axis is arranged parallel to the propagation direction of the light bundles.

34. The optical arrangement as defined in claim 28, wherein the reflection device is arranged and configured so at least one reflected light bundle is reflected at a reflection angle differing at least slightly from zero degrees.

35. The optical arrangement as defined in claim 34, wherein the reflection device comprises a mirror.

* * * * *

UNITED STATES PATENT AND TRADEMARK OFFICE
CERTIFICATE OF CORRECTION

PATENT NO. : 6,515,802 B2
DATED : February 4, 2003
INVENTOR(S) : Johann Engelhardt Page 1 of 1

It is certified that error appears in the above-identified patent and that said Letters Patent is hereby corrected as shown below:

<u>Column 10,</u>
Line 36, cancel "29" and insert -- 31 --
Line 40, cancel "30" and insert -- 32 --
Line 44, cancel "28" and insert -- 30 --

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,515,802 B2  
DATED : February 4, 2003  
INVENTOR(S) : Johann Engelhardt Page 1 of 1

It is certified that error appears in the above-identified patent and that said Letters Patent is hereby corrected as shown below:

Column 8,  
Line 57, cancel "7" and insert -- 8 --  
Line 62, cancel "7" and insert -- 10 --  
Line 64, cancel "9" and insert -- 10 --

Column 9,  
Line 1, cancel "10" and insert -- 11 --  
Line 5, cancel "9" and insert -- 10 --  
Line 10, cancel "12" and insert -- 13 --  
Lines 22 and 26, cancel "14" and insert -- 15 --  
Lines 29 and 39, cancel "16" and insert -- 17 --  
Line 37, cancel "17" and insert -- 18 --  
Line 47, cancel "21" and insert -- 22 --

Column 10,  
Lines 1 and 5, cancel "14" and insert -- 15 --  
Line 12, cancel "24" and insert -- 26 --  
Line 15, cancel "25" and insert -- 27 --  
Line 19, cancel "25" and insert -- 26 --  
Line 33, cancel "29" and insert -- 30 --  
Line 36, cancel "29" and insert -- 31 --  
Line 40, cancel "30" and insert -- 32 --  
Line 44, cancel "28" and insert -- 30 --

This certificate supersedes Certificate or Correction issued May 25, 2004.

Signed and Sealed this

Twenty-fourth Day of August, 2004

JON W. DUDAS  
*Director of the United States Patent and Trademark Office*